United States Patent
Nelligan (10) Patent No.: US 8,776,727 B1
(45) Date of Patent: Jul. 15, 2014

(54) MULTIPLE USE MODULAR APPARATUS FOR ANIMALS

(71) Applicant: Kathryn Nelligan, Townsend, MA (US)

(72) Inventor: Kathryn Nelligan, Townsend, MA (US)

(*) Notice: Subject to any disclaimer, the term of this patent is extended or adjusted under 35 U.S.C. 154(b) by 123 days.

(21) Appl. No.: 13/941,840

(22) Filed: Jul. 15, 2013

Related U.S. Application Data (63) Continuation of application No. 12/534,518, filed on Aug. 3, 2009, now abandoned.

(51) Int. Cl.
*A01K 15/02* (2006.01)

(52) U.S. Cl.
CPC .................................... *A01K 15/027* (2013.01)
USPC .......................................... 119/706; 119/702

(58) Field of Classification Search
USPC ................ 119/702, 706, 482, 484, 28.5, 485; 47/39; 211/71.01, 205, 85.13, 134, 211/153, 186; D30/160; D6/474, 460, 461
See application file for complete search history.

(56) References Cited

U.S. PATENT DOCUMENTS

| D326,377 | S | * | 5/1992 | Nagel | D6/461 |
| 5,806,464 | A | * | 9/1998 | Willinger et al. | 119/706 |
| 5,875,735 | A | * | 3/1999 | Bradley et al. | 119/706 |
| 6,431,120 | B1 | * | 8/2002 | Feldman | 119/706 |

* cited by examiner

*Primary Examiner* — Trinh Nguyen
(74) *Attorney, Agent, or Firm* — Joseph E. Funk (57) ABSTRACT

A multiple use modular apparatus for animals having a tower and a base is disclosed that is light weight, easily assembled and reconfigured, and ballast is added inside the tower and base to stabilize the apparatus. The tower is inserted into the base in a very snug interference fit, and the tower has tiers of rows of recesses around its periphery facing in different directions. Shelf pieces of different sizes and shapes and having protrusions extending from one edge are utilized. The protrusions of the shelf pieces are inserted into the recesses in the side of the tower in a snug interference fit to firmly hold the shelf pieces to the sides of the tower. The shelf pieces may be fastened to the tower in a wide variety of configurations to create steps, walkways and platforms. Pieces of carpet or other material may be fastened to the sides of the tower and to the tops of the shelves, walkways and platforms. The modular apparatus may be used by an animal for exercise, play and resting. The shelves are easily removed and reattached to different positions on the sides of the tower to create the wide variety of configurations of shelves, walkways and platforms that will keep an animal interested in exploring the apparatus. In addition, the pieces may be assembled into complex arrangements having multiple towers, interconnecting walkways and toys mounted on the shelves and platforms.

10 Claims, 6 Drawing Sheets

MULTIPLE USE MODULAR APPARATUS FOR ANIMALS

CROSS REFERENCE TO RELATED APPLICATIONS

This is a continuation of U.S. patent application Ser. No. 12/534,518 entitled "Multiple Use Modular Apparatus For Animals" to Kathryn Nelligan with an effective US filing date of Aug. 3, 2009.

FIELD OF THE INVENTION

The invention relates to a multiple use modular apparatus for animals that may be assembled in many different configurations to provide a place for animals to perch, scratch, play and exercise.

BACKGROUND OF THE INVENTION

It is well known that animals, and in particular cats, like places to perch, exercise, climb, play and scratch. It is important to provide a multi-function apparatus for a cat to perch, exercise, play, climb and scratch on, and especially for indoor cats whether clawed or de-clawed. These activities are natural for cats and it is important for the health of a cat to provide such an apparatus on which to pursue these activities so that they will use the apparatus as their primary device for these activities apparatus, and thus a cat will not ruin any furniture.

Prior art animal devices such as perches are very often made from a large number of pieces that must be disassembled in order to reconfigure the animal perch. As a result it is a time consuming task to both assemble and thereafter reconfigure the animal perch.

Other prior art animal perches are assembled but are not reconfigurable thereafter, and some perches must be positioned adjacent to a wall and be fastened thereto.

Still other prior art modular animal perches are so light weight that that they are easily disturbed by an animal jumping on them.

SUMMARY OF THE INVENTION

The above described problems of prior art animal perches are solved by the present invention.

The present invention is a multiple use, modular apparatus for animals that is easily assembled and is easily reconfigured thereafter. In addition, the novel apparatus can be positioned anywhere and does not have to be fastened to a wall.

The novel multiple use, modular apparatus comprises a tower portion that may consist of one, two or three portions that partially nest inside of each other as they are stacked. When they are so stacked they are securely held together without any fasteners. The bottom of the assembled vertical tower then sets inside a recess in the top of a base where it is secure held without any fasteners.

The tower and the base portion are each hollow and each has a hole with a plug. When the plugs are temporarily removed sand, water, gravel or other material is inserted into the interior of the tower and base to provide ballast that helps prevent the assembly from being disturbed by an animal jumping and climbing thereon.

The tower preferably has a square cross section and each of the four sides of the tower has a tier of rows of recesses therein. Shelves are provided that quickly and easily attach to the tower at different heights from the base. Each shelf has protrusions on one edge that are inserted by force fit into one row or holes or recesses on one of the four sides of the tower. The force fit holds each shelf firmly to the tower even when an animal jumps thereon time and time again. To reconfigure the shelves on each of the four sides of the tower they are pulled out of the holes or recesses they are currently inserted in and they are then reinserted into different rows of holes.

The shelves may have different shapes and may have holes vertically there through and an animal may crawl through the holes to different shelves, walkways and platforms on the tower.

Multiple towers may be built into a complex arrangement of a multiple use modular apparatus for animals. The towers may be interconnected with walkways and with ladders to make a more pleasing arrangement that is more fun for an animal to play on. In addition, poles with swinging toys and other play type elements may be affixed to a tower and to the shelves.

DESCRIPTION OF THE DRAWING

The invention will be better understood upon reading the following Detailed Description in conjunction with the drawing in which:

FIG. 7 shows a second configuration of a shelf with a hole there through;

DETAILED DESCRIPTION

Figure 1:
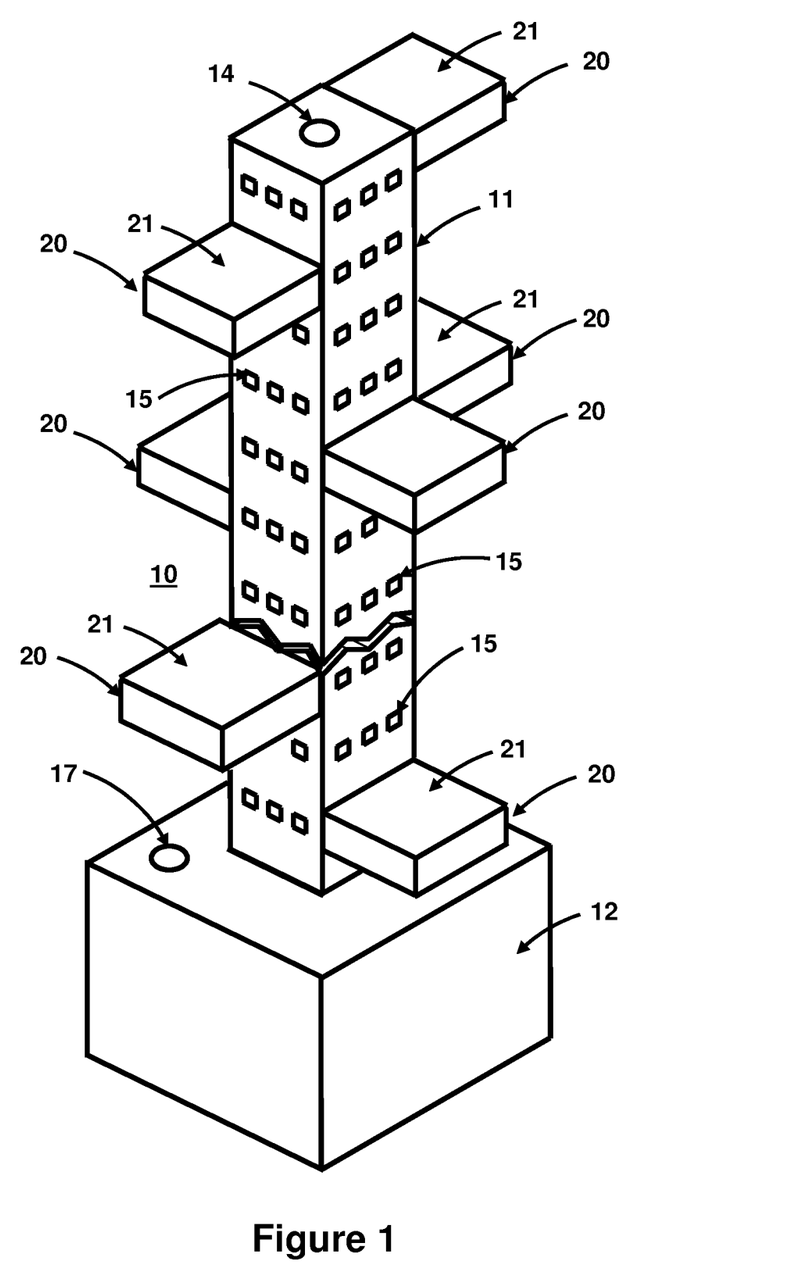
FIG. 1 shows one of many possible configurations of the novel multiple use modular apparatus for animals.

FIG. 1 shows one of many possible configurations of the novel multiple use, modular apparatus 10 for animals. The tower portion 11 is inserted into the base portion 12 by a force fit. Base portion 12 has an access hole 17 with plug therein (not specifically shown). The plug is temporarily removed and sand, water, gravel or other material (not shown) is poured into base 12 as ballast to give base 12 weight which helps stabilize apparatus 10 even as an animal climbs and jumps thereon. Similarly, tower portion 11 has a hole 14 with plug therein (not specifically shown). The plug is temporarily removed and sand, water, gravel or other material (not shown) is only poured into the bottom of tower 11 as ballast to give tower 11 weight which also helps stabilize apparatus 10. If ballast material is poured too high inside tower 11 it will destabilize apparatus 10.

Each shelf 20 has mounting protrusions 22 (not shown in FIG. 1 but shown in other Figures) that are inserted into a row of recesses or holes 15 in one of the four side walls of tower 11 in a force fit manner to assure that each shelf 20 will remain attached to tower 11 until deliberately removed from the side of tower 11 by force. Only one type of shelf 20 is shown in FIG. 1. The details of two other shelves 23 and 26 and their protrusions 22 are shown in and described with reference to FIGS. 6-8 and 9, and how the protrusions 22 of shelf 23 are inserted into recesses 15 in wall of tower 11 is shown in and described with reference to FIG. 8.

While only square shelves 20 are shown in FIG. 1 the shelves may be of different shapes such as shown in FIGS. 7-9 and 10. In addition, the shelves may be of different sizes such as shelf 26 in FIG. 9. Further, shelves may have holes 25 there through (not shown in FIG. 1) but shown in and described with reference to FIGS. 7-9. The holes 25 are of a size that an animal, such as a cat, may easily crawly through the holes to access different shelves, walkways and platforms of apparatus 10. In addition, while mounting protrusions 22 are shown as having a square cross section and mating recesses 15 also have a square cross section, the cross sectional shape may be round, triangular or of any other shape.

Figure 9:
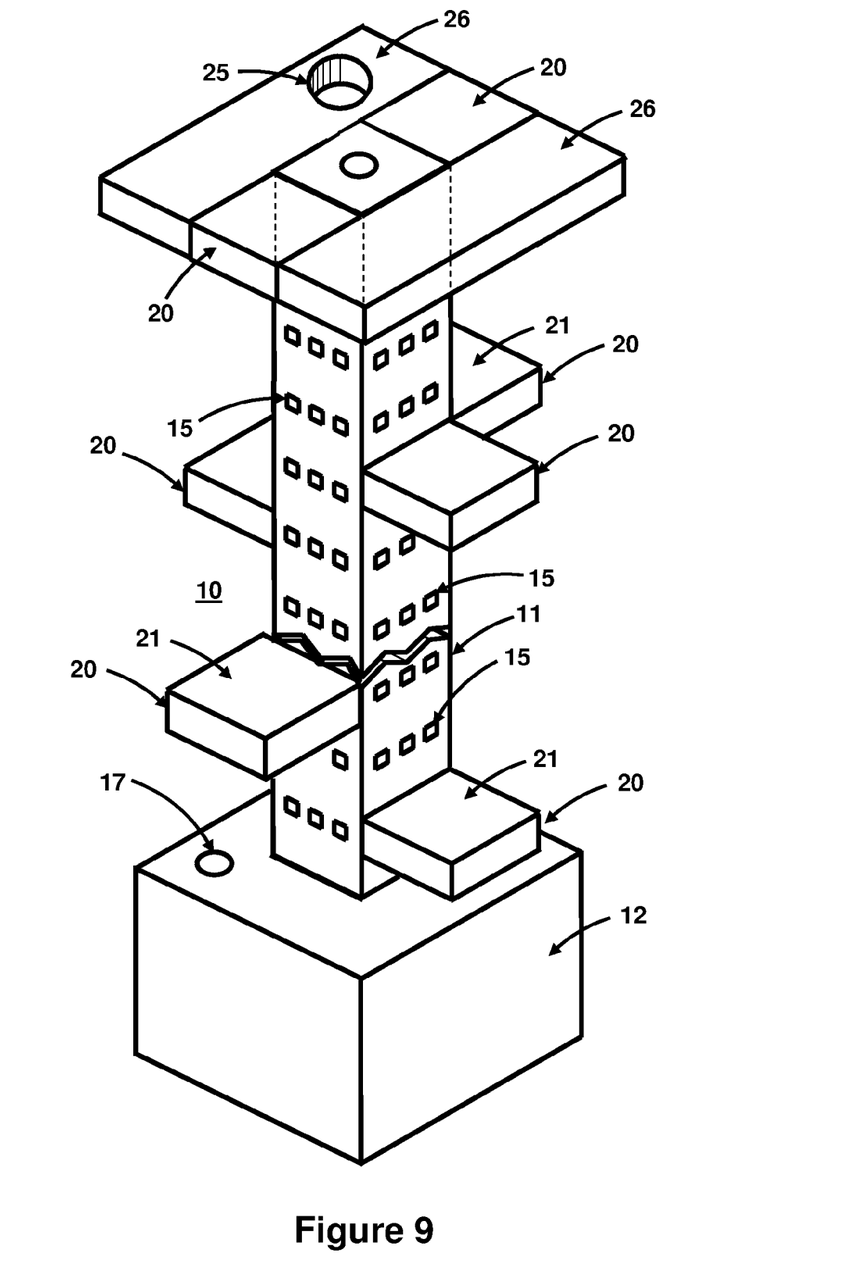
FIG. 9 shows another configuration of the novel multiple use modular apparatus for animals in which shelf pieces are used to create a platform on top of the apparatus, and access to the top of the platform via a hole through one of the shelf pieces.

Shelves 20 shown in FIG. 1 are protruding from all four sides of tower 11 at various heights. However, as shown in one instance in FIG. 1 shelves 21 may be inserted into different sides of tower portion 11 at the same level. When there are four shelves having mating shapes (not shown) fastened to the same level or height on all four sides of tower 11 a walkway may be formed fully around tower 11. This is better seen in and described with reference to FIG. 9 which shows a platform created on top of the tower. To create the platform four properly shaped shelf pieces are attached to the top row of recesses 15 in the four sides of tower 15 as shown. One shelf 26 has a hole 25 there through. To create this type of configuration shelf pieces 20 and 26 need protrusions 22 and recesses 15 in more than one of their sides. In FIG. 9 the two shelves 20 and the two shelves 26 have protrusions 22 (not shown) for inserting them into recesses 15 (not shown) in the top level of tower 11, but where other sides of shelves 20 and 26 abut each other there are protrusions 22 in one shelf and recesses 15 in the abutting shelf to fasten them together.

To reconfigure a modular apparatus 10 the shelves 20 and/or 26 are pulled out of the sides of tower 11 and reinserted into different recesses 15 at different elevations. When different shapes, sizes and types of shelves and other components are used, coupled with the many rows of recesses 15 in all four sides of tower portion 11, a very wide range of configurations of modular apparatus 10 may be constructed. For example, see FIG. 10.

In addition, the top surfaces of the shelves 20 or other elements may have a piece of carpet 21 adhered thereto which may have many purposes including creating a horizontal scratching surface for a cat. Pieces of carpet may also be attached to the sides (not shown) of an assembled tower 10 to create scratching surfaces for a cat. Carpeting that is plush may be used on some horizontal surfaces, such as the top surface of the platform (not shown) shown in FIG. 9, to make a comfortable surface for an animal to lie on.

While in FIG. 1 and other Figures tower portion 11 is shown having a square cross section, other cross sectional shapes may be used. For example, a circular cross section may be used. In that case the recesses 15 around the periphery of the tubular tower portion 11 will face in many directions and, accordingly, the shelf pieces have different shapes including a curved side to mate against the side of a circular cross section tower so that shelf pieces 20 may extend in any of those directions. Similarly, base 12 may not have a box like shape as shown, but may also be circular with a rounded top, or have other shapes.

Figure 2:
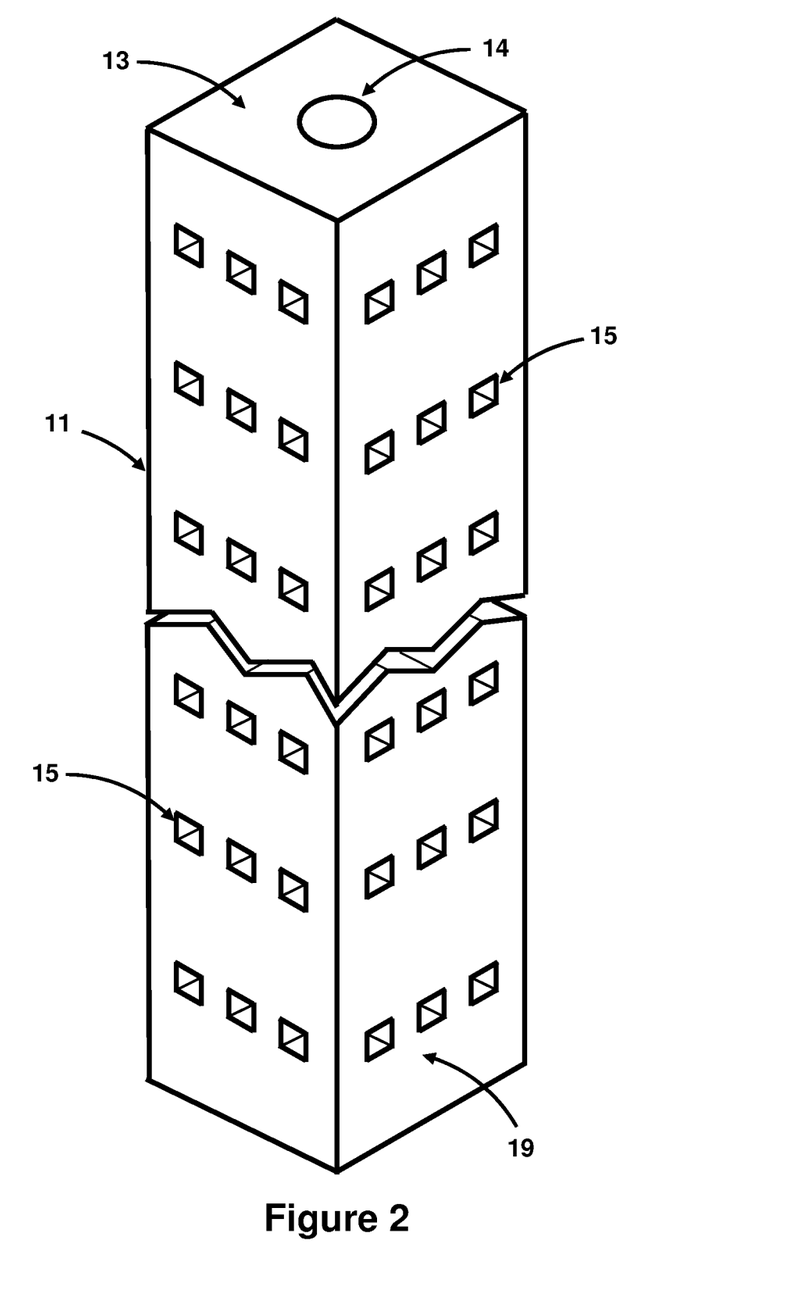
FIG. 2 shows just the tower portion of the novel multiple use modular apparatus for animals.

In FIG. 2 is shown just the tower portion 11 of the novel multiple use modular apparatus 10 for animals. The hole 14 with plug is shown in top 13 of tower 11 into ballast is poured. The many tiers of recesses 15 in the sides of tower 11 are shown that are used for attaching shelves thereto such as shelves 20, 23 and 26 shown in other figures. Tower 11 has a cut shown there through to deliberately truncate the height of the tower in FIG. 1 and other figures in a manner known in the drawing art. While only six tiers of recesses 15 are shown, in reality there are many more tiers of recesses 15.

Figure 3:
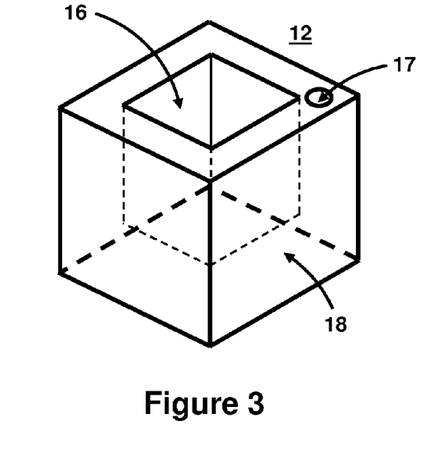
FIG. 3 shows just the base portion of the novel multiple use modular apparatus for animals.

In FIG. 3 is shown just the base portion 12 of the novel apparatus 10 for animals. In the top, middle of base 12 there is a square recess 16 into which the bottom of tower portion 11 is inserted when it is attached to base 12 as shown in FIGS. 1, 4, 5 and 9. It can be seen that the depth of recess 16 does not go all the way through base 12. The cross sectional area of recess 16 is equal to the cross sectional area of the base of tower 11 so that tower 11 will fit snugly therein by force fit. The hole 17 with plug is also shown. The plug is removed and ballast in poured into the base to fill it and thereby improve the stability of apparatus 10. The horizontal width of base 12 will usually be wider for improved stability of apparatus 10. The wider base 12 is the wider shelves attached to tower portion 11 may be.

Figure 4:
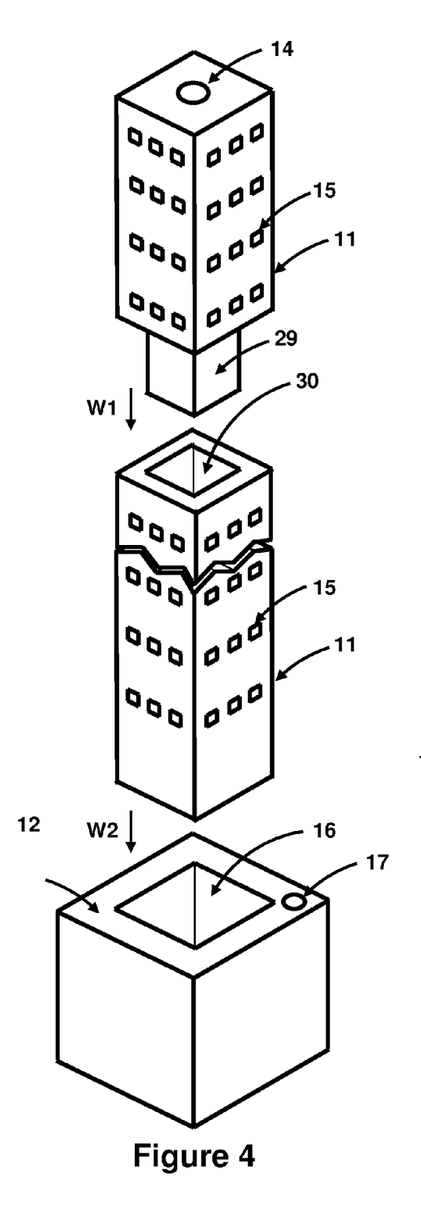
FIG. 4 shows two tower portions being joined together and then being inserted into the base portion of the novel multiple use modular apparatus for animals, with no shelves attached.

FIG. 4 shows two portions of tower 11 being assembled together and the bottom of tower portion 11 being inserted into hole 16 in the top of base portion 12 of the novel modular apparatus for animals 10, with no shelves 20 attached. The bottom of tower 11 is inserted in the direction of arrow W2 into recess 16 in the top of base 12. Individual tower portions may be two to three feet long. The bottom of each portion has a protrusion 29 that is inserted in the direction of arrow W1 into a mating hole 30 of the next lower portion of tower 11. Only the top most portion of tower 11 does not have an assembly hole 30 therein. While two such tower portions are shown in FIG. 4 there may be three or four tower sections stacked.

Figure 5:
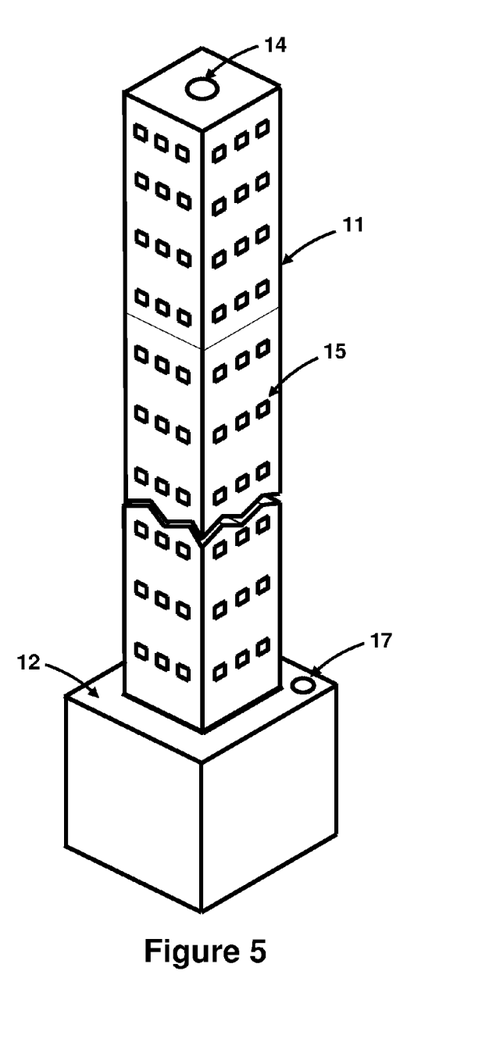
FIG. 5 shows the tower portion fully inserted into the base portion of the novel multiple use modular apparatus for animals, ready to have shelves attached thereto.

FIG. 5 shows tower portion 11 fully assembled with no shelves attached. The ballast material (not specifically shown) is typically poured into base 12 before tower 11 is inserted into it, and ballast material (not specifically shown) is typically poured into tower 11 after the base of tower 11 is inserted into base 12. As previously mentioned ballast may be sand, gravel, water or other material.

Figure 6:
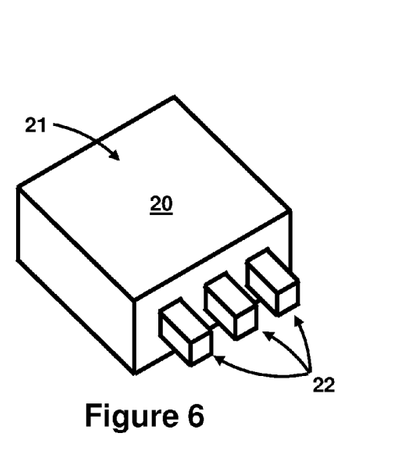
FIG. 6 shows a first configuration of a shelf.

FIG. 6 shows a first configuration of a single shelf 20. Shelf 20 is shown square but may be of many different shapes and sizes such as, but limited to, the rounded shape shelf 23 shown in FIGS. 7 and 8, and the rectangular shape shelf 26 shown in FIG. 9. The top surface of each shelf 20 or the other shelves may have a piece of carpet 21 or other material fastened thereto by an adhesive for many purposes including creating a horizontal scratching surface for a cat. Pieces of carpet may also be attached to the sides of an assembled tower 10 to create scratching surfaces for a cat. Carpeting that is plush may be used on horizontal surfaces, such as the top surface or platform shown in FIG. 9, to make a comfortable surface for an animal to lie on.

Figure 7:
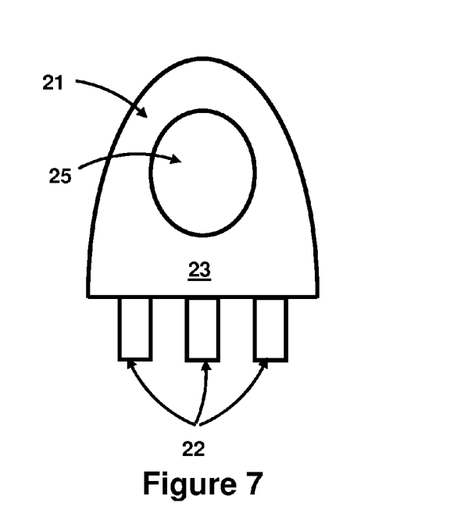

FIG. 7 shows a rounded shaped shelf 23 having a hole 25 through it, and having a piece of carpet 21 or other material fastened to its top surface for many purposes including creating a horizontal scratching surface for a cat. Hole 25 is large enough that it permits a cat or other small animal to climb through hole 25 onto the shelf. While a hole 25 is only shown through shelf 23 it may also be through shelves of different shapes, such as the square shelf 20 shown in FIG. 6 and a rectangular 26 shelf as shown FIG. 9.

Figure 8:
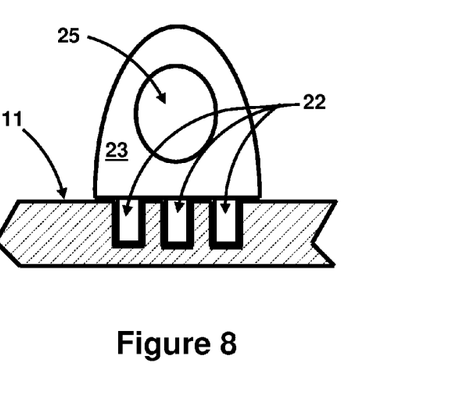
FIG. 8 is a cross section of the wall of the tower portion showing the protrusions of a shelf inserted one row of recesses in the tower wall.

FIG. 8 is a cross section of the wall of tower 11 showing the protrusions 22 of a shelf 23 inserted one row of recesses 15 (not marked by an element number in FIG. 8) in the wall of tower 11. The cross sectional area of each protrusion 22 extending from the side of a shelf, such as shelf 23, is equal to the cross sectional area of a recess 15 in the side wall of tower 11 so that the shelf will fit therein by force fit and thereby hold the shelf firmly to the side of tower 11. While three protrusions and recesses are shown more may be utilized.

FIG. 9 shows a configuration of the novel apparatus 10 for animals in which two different type of shelf pieces 20 and 26 are used to create a complete platform on top of apparatus 10. The four shelf pieces 20 and 26 are inserted into the top most tier of recesses 15 around the top of tower 11. In this position the tops of the four shelf pieces 20 and 26 are flush with the top of tower 11 to create a flat platform. Such a platform creates a larger area on which an animal, such as a cat, may lie down, sleep or play. The top of the platform may be covered with carpet or other material (preferably softer) that the animal likes to lie on. In addition, there is a hole 25 through at least one of the two elongated shelf pieces 26 that is large enough for the animal to crawl through after climbing up using the other shelf pieces 20 along the sides of tower 11. The two shelves 20 and the two shelves 26 have protrusions 22 (not shown) for inserting them into recesses 15 (not shown) in the top level of tower 11, but where other sides of shelves 20 and 26 abut each other there are protrusions 22 in one shelf and recesses 15 in the abutting shelf to fasten them together.

When the same four shelf pieces 20 and 26 are fastened to the sides of tower 11 at the same height but below the top of tower 11 a walkway (not shown) is thereby created around the tower. The length of the walkway along any one side of the tower may be long enough for an animal to stretch out thereon.

Figure 10:
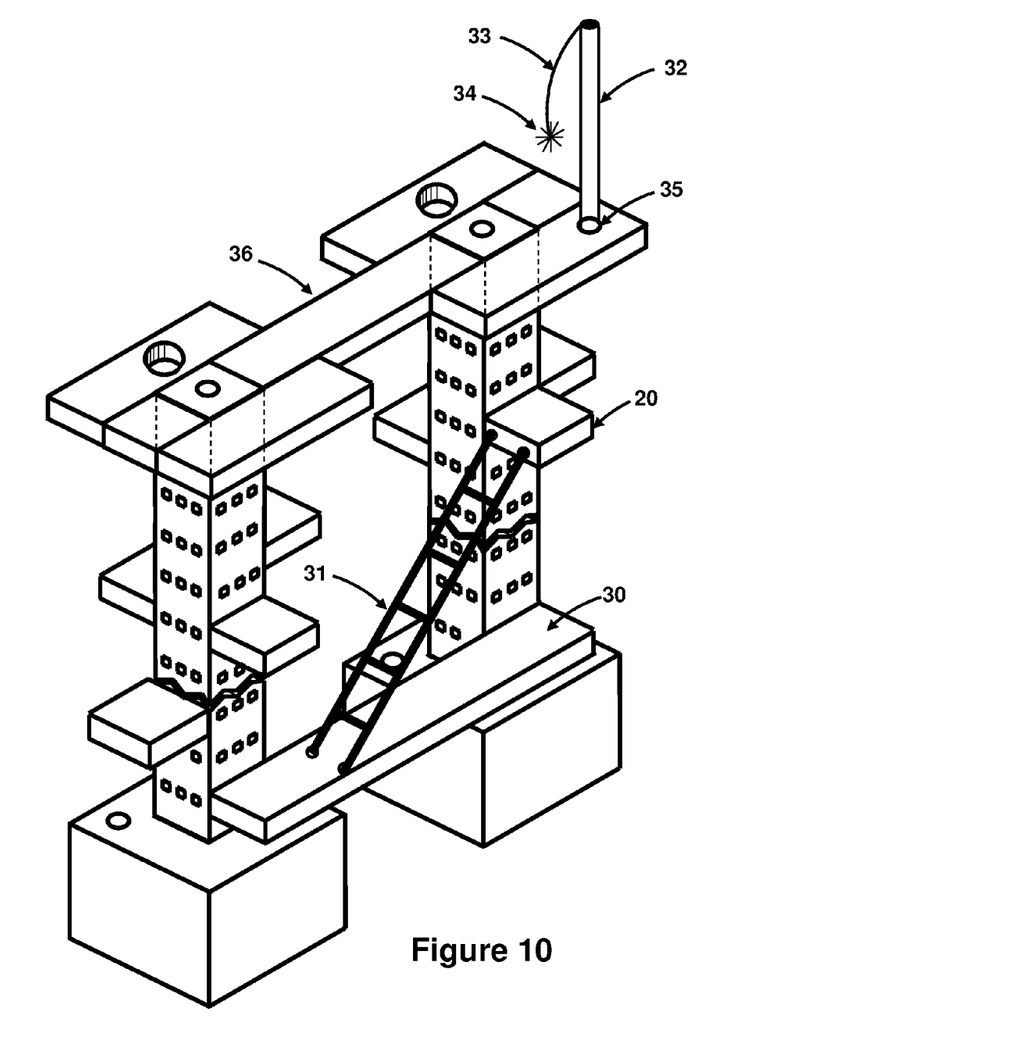
FIG. 10 shows an example of a complex configuration of the novel multiple use modular apparatus for animals in which more modular pieces are included.

FIG. 10 shows an example of a complex configuration of the novel multiple use modular apparatus for animals in which more modular pieces are included. All the element numbers shown in other figures are not shown in this Figure to avoid cluttering the drawing. Two towers, alike those shown in and described with reference to FIG. 9, are combined to create a more complex modular apparatus for animals. The platforms on top of each of the two towers are interconnected by a walkway 36, and another interconnecting walkway 30 is mounted lower on the two towers. On top of the right hand tower one of the shelf pieces has a hole therein into which is inserted a pole 32 which has a string 33 attached to its top. The free end of string 33 has a small toy 34 attached thereto that can be batted around by an animal. Such poles may be mounted anywhere on the shelves attached to the towers.

A ladder 31 for climbing is also attached as shown. Shelf 20 has two recesses in one side, and there are two recesses in the top surface of walkway 30. Both ends of ladder 31 have angled ends that are inserted into the recesses in an interference fit to firmly hold ladder 31.

While only one variation is shown in using the modular pieces of the invention to construct one complex arrangement of the invention, the number of variations are only limited by the imagination.

While what has been described hereinabove is a preferred embodiment of the invention those skilled in the art will understand that numerous changes may be made without departing from the spirit and scope of the invention. Some variations are described hereinabove.

The invention claimed is:

1. A multiple use modular apparatus for animals to exercise, play and rest, the apparatus comprising:

a base having an upper surface and a bottom surface resting on a support surface, the base having a recess in its upper surface and having a hollow area inside of it;

a generally vertical tower having a top surface, a bottom surface and side walls, and the side walls of the tower have a plurality of recesses therein positioned in tiers of rows of recesses up the side walls of the tower between the bottom surface and the top surface of the tower, wherein the bottom surface of the tower sits snugly in the recess in the upper surface of the base; and a plurality of shelf pieces each having a top surface, a bottom surface and side walls, the shelf pieces having protrusions extending from the side walls thereof, and the shelf pieces are attached to the sides of the tower by inserting their protrusions snugly into the recesses in the side walls of the tower at different positions between the top and bottom surfaces of the tower;

wherein a first group of the plurality of shelf pieces are all attached to the sides of the tower at a particular height between the top of the tower and the bottom of the tower and the first group of shelf pieces have mating shapes that abut each other to create a continuous walkway all the way around the tower, and wherein at least one of the first group of shelf pieces has a hole there through between its top surface and its bottom surface that is large enough for an animal to pass through to reach the top of the walkway;

wherein an animal climbs the tower by climbing up the shelf pieces, other than the first group of shelf pieces, attached to the side walls of the tower.

2. The multiple use modular apparatus of claim 1 wherein the cross sectional shape and size of the bottom surface of the tower is the same as the cross sectional shape and size of the recess in the upper surface of the base to facilitate snugly fitting the bottom surface of the tower into the recess in the upper surface of the base.

3. The multiple use modular apparatus of claim 2 wherein the cross sectional shape and size of the protrusions extending from the side walls of shelf piece is the same as the cross sectional shape and size of the recesses in the side walls of the tower to facilitate snugly fitting the protrusions into the recesses so the shelves may not easily be removed from the side walls of the tower.

4. The multiple use modular apparatus of claim 3 wherein some shelves, other than the shelf pieces forming the continuous walkway around the tower have a hole there through between their top surface and their bottom surface that is large enough for an animal to pass through as they climb the tower.

5. The multiple use modular apparatus of claim 1 wherein the base has a hollow portion into which ballast is inserted upon assembly of the apparatus to provide ballast for stability of the apparatus.

6. A multiple use modular apparatus for animals to exercise, play and rest, the apparatus comprising:

a base having an upper surface and a bottom surface resting on a support surface, the base having a recess in its upper surface and having a hollow area inside of it;

a generally vertical tower having a top surface, a bottom surface and side walls, the bottom surface of the tower sitting snugly in the recess in the upper surface of the base, wherein the side walls of the tower have a plurality of first attachment means between the bottom surface and the top surface of the tower; and a plurality of shelf pieces each having a top surface, a bottom surface and side walls, the shelf pieces each having second attachment means on the side walls thereof, wherein the shelf pieces are attached to the sides of the tower by engaging the second attachment means of the shelf pieces with the first attachment means on the side walls of the tower at different positions between the top and bottom surfaces of the tower to permit an animal to climb the modular apparatus;

wherein a first group of the plurality of the shelf pieces have mating shapes, have their second attachment means attached to the first attachment means at the top of all the side walls of the tower on all sides of the tower so they abut each other, and this last mentioned first group of the shelf pieces all have their top surfaces level with each other all around the tower and level with the top surface of the tower to create a complete, flat platform on which an animal may sit, lie or play; and wherein there is a hole through at least one of the first group of shelf pieces creating the platform that is large enough for an animal to pass through to reach the top of the platform.

7. The multiple use modular apparatus of claim 6 wherein some shelves, other than the first group of shelf pieces forming the platform at the top of the tower, have a hole there through between their top surface and their bottom surface that is large enough for an animal to pass through as they climb the tower.

8. The multiple use modular apparatus of claim 6 wherein the base has a hollow portion into which ballast is placed upon assembly of the apparatus to provide stability of the apparatus.

9. The multiple use modular apparatus of claim 6 wherein the cross sectional shape and size of the bottom surface of the tower is the same as the cross sectional shape and size of the recess in the upper surface of the base to facilitate snugly fitting the bottom surface of the tower into the recess in the upper surface of the base.

10. The multiple use modular apparatus of claim 9 wherein the cross sectional shape and size of the protrusions extending from the side walls of shelf piece is the same as the cross sectional shape and size of the recesses in the side walls of the tower to facilitate snugly fitting the protrusions into the recesses so the shelves may not easily be removed from the side walls of the tower.

\* \* \* \* \*